United States Patent
Pan et al.

(10) Patent No.: US 10,331,231 B2
(45) Date of Patent: Jun. 25, 2019

(54) MOBILE TERMINAL AND METHOD FOR DETERMINING SCROLLING SPEED

(71) Applicant: Beijing Xiaomi Mobile Software Co., Ltd., Haidian District, Beijing (CN)

(72) Inventors: Shuangquan Pan, Beijing (CN); Guilin Zhong, Beijing (CN); Guosheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 27 days.

(21) Appl. No.: 15/649,656

(22) Filed: Jul. 14, 2017

(65) Prior Publication Data
US 2018/0032152 A1   Feb. 1, 2018

(30) Foreign Application Priority Data
Jul. 26, 2016 (CN) .......................... 2016 1 0595837

(51) Int. Cl.
| | |
|---|---|
| *G06F 1/16* | (2006.01) |
| *G06F 3/0346* | (2013.01) |
| *G06F 3/0481* | (2013.01) |
| *G06F 3/0485* | (2013.01) |

(52) U.S. Cl.
CPC .......... *G06F 3/0346* (2013.01); *G06F 3/0485* (2013.01); *G06F 3/04817* (2013.01); *G06F 1/1652* (2013.01); *G06F 1/1694* (2013.01)

(58) Field of Classification Search
CPC .. G06F 3/0346; G06F 3/0485; G06F 3/04817; G06F 1/1652; G06F 1/1694
See application file for complete search history.

(56) References Cited

U.S. PATENT DOCUMENTS

| | | | |
|---|---|---|---|
| 2009/0262074 A1* | 10/2009 | Nasiri | A63F 13/06 345/158 |
| 2010/0011291 A1* | 1/2010 | Nurmi | G06F 3/0414 715/702 |
| 2010/0056223 A1 | 3/2010 | Choi | |

(Continued)

FOREIGN PATENT DOCUMENTS

KR    20150125615 A    11/2015

OTHER PUBLICATIONS

Supplementary European Search Report in European application No. 17174677.9, dated Nov. 29, 2017.

*Primary Examiner* — Ibrahim A Khan
(74) *Attorney, Agent, or Firm* — Jun He Law Offices P.C.; James J. Zhu

(57) ABSTRACT

A mobile terminal and a method for determining a scrolling speed are provided. The mobile terminal includes: a flexible screen configured to display an application icon on an application icon presentation interface; at least two accelerometers located in different positions on the flexible screen, the at least two accelerometers being configured to detect accelerations on the flexible screen; and a processing module configured to calculate a bending speed of the flexible screen according to the accelerations detected by the at least two accelerometers, and determine a scrolling speed of the application icon on the application icon presentation interface according to the bending speed, wherein the bending speed is a changing speed of a bending angle of the flexible screen.

18 Claims, 5 Drawing Sheets

(56) References Cited

U.S. PATENT DOCUMENTS

| | | | |
|---|---|---|---|
| 2013/0093660 A1* | 4/2013 | Hirsch | G06F 1/1652 345/156 |
| 2013/0201093 A1* | 8/2013 | Kim | G06F 3/033 345/156 |
| 2013/0265221 A1* | 10/2013 | Lee | G06F 3/01 345/156 |
| 2013/0265257 A1* | 10/2013 | Jung | G06F 3/0412 345/173 |
| 2013/0265260 A1* | 10/2013 | Seo | G06F 3/041 345/173 |
| 2013/0296000 A1* | 11/2013 | Park | G09G 3/001 455/566 |
| 2014/0029017 A1* | 1/2014 | Lee | G01B 11/24 356/601 |
| 2014/0055375 A1* | 2/2014 | Kim | G06F 1/1652 345/173 |
| 2014/0068478 A1* | 3/2014 | Won | G06F 3/0488 715/765 |
| 2014/0078047 A1* | 3/2014 | Seo | G06F 3/0487 345/156 |
| 2015/0200375 A1* | 7/2015 | Kim | G09F 9/301 257/40 |
| 2015/0220118 A1* | 8/2015 | Kwak | G06F 3/14 345/667 |
| 2016/0259514 A1* | 9/2016 | Sang | G06F 3/04817 |
| 2017/0045996 A1* | 2/2017 | Ka | G06F 3/0483 |
| 2017/0052566 A1 | 2/2017 | Ka et al. | |
| 2017/0257131 A1* | 9/2017 | Debates | G06F 1/1652 |

* cited by examiner

MOBILE TERMINAL AND METHOD FOR DETERMINING SCROLLING SPEED

CROSS-REFERENCE TO RELATED APPLICATIONS

This application is based upon and claims priority from a Chinese Patent Application No. 201610595837.4, filed with the State Intellectual Property Office of People's Republic of China on Jul. 26, 2016, the entire contents of which are incorporated herein by reference.

TECHNICAL FIELD

The disclosure relates to the field of electronic devices, and more particularly, to a mobile terminal and a method for determining a scrolling speed.

BACKGROUND

If mobile terminals have an independent operating system and independent running space, a user may install applications such as software, games, and navigation in the mobile terminals, and the mobile terminals may implement wireless network access by using a mobile communications network, such mobile terminals are generally referred to as smart mobile terminals. A smart mobile terminal is usually configured with a relatively large display screen and can implement full-touch-screen operations, and an operation manner is much better than that of a keyboard type terminal.

With the rapid development of smart mobile terminals, the concept of flexible screens starts to emerge. Compared with a conventional display screen, a flexible screen is not only lighter and thinner, but also has greatly reduced power consumption. Meanwhile, a flexible screen has characteristics of being bendable and desirably pliable, and therefore also has greatly improved durability.

SUMMARY

According to a first aspect of embodiments of the present disclosure, there is provided a mobile terminal and the mobile terminal includes: a flexible screen configured to display an application icon on an application icon presentation interface; at least two accelerometers located in different positions on the flexible screen, the at least two accelerometers being configured to detect accelerations on the flexible screen; and a processing module configured to calculate a bending speed of the flexible screen according to the accelerations detected by the at least two accelerometers, and determine a scrolling speed of the application icon on the application icon presentation interface according to the bending speed, wherein the bending speed is a changing speed of a bending angle of the flexible screen.

According to a second aspect of embodiments of the present disclosure, there is provided a method for determining a scrolling speed, applied to a mobile terminal which comprises a flexible screen for displaying an application icon on an application icon presentation interface, at least two accelerometers located in different positions on the flexible screen, and a processing module. The method includes: detecting, by the at least two accelerometers, accelerations on the flexible screen; calculating, by the processing module, a bending speed of the flexible screen according to the accelerations detected by the at least two accelerometers, wherein the bending speed is a changing speed of a bending angle of the flexible screen; and determining, by the processing module, a scrolling speed of the application icon on the application icon presentation interface according to the bending speed.

According to a third aspect of embodiments of the present disclosure, there is provided a mobile terminal, and the mobile terminal includes: a processor; and a memory for storing instructions executable by the processor; wherein the processor is configured to: detect accelerations on a flexible screen by using at least two accelerometers located in different positions on the flexible screen; and calculate a bending speed of the flexible screen according to the accelerations detected by the at least two accelerometers, and determine a scrolling speed of an application icon on an application icon presentation interface according to the bending speed, wherein the bending speed is a changing speed of a bending angle of the flexible screen.

It should be understood that the foregoing general description and the subsequent details are merely exemplary, and cannot be used to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Herein, the exemplary implementations and the description of the disclosure are used to explain the disclosure, but are not used to limit the disclosure.

Embodiments of the disclosure provide a mobile terminal and a method for determining a scrolling speed. The disclosure is described below in detail with reference to the accompanying drawings.

Figure 1:
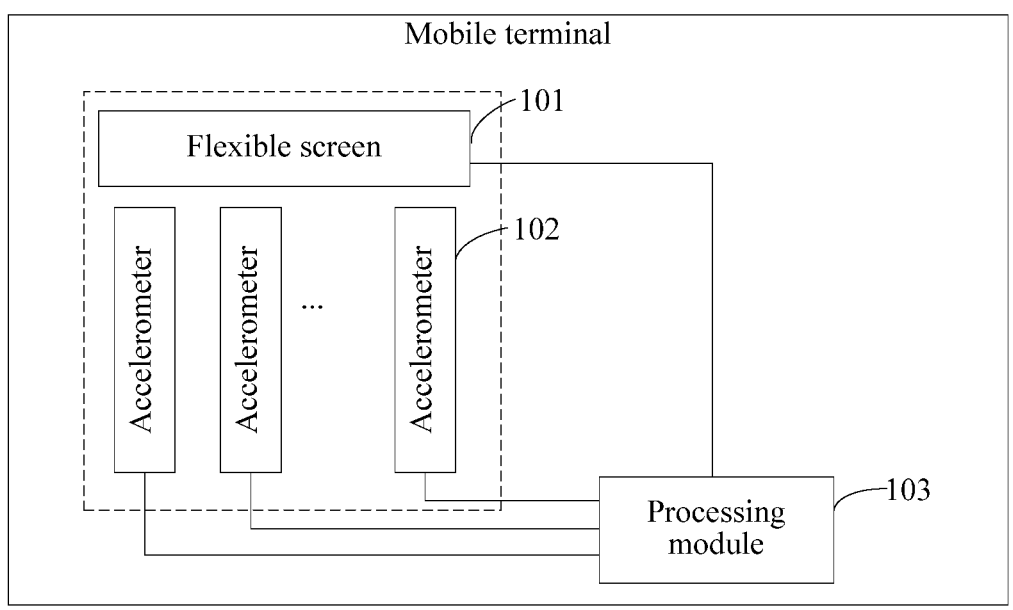
FIG. 1 is a schematic diagram of a structure of a mobile terminal according to an exemplary embodiment.

FIG. 1 is a schematic diagram of a structure of a mobile terminal according to an exemplary embodiment. As shown in FIG. 1, the mobile terminal at least includes: a flexible screen 101, at least two accelerometers 102, and a processing module 103. The at least two accelerometers 102 are located in different positions on the flexible screen 101, and the at least two accelerometers 102 are connected to the processing module 103.

In this embodiment, the accelerometer 102 is configured to detect an acceleration. The acceleration is a vector that has magnitude and direction. A working principle of the accelerometer 102 is as follows. The accelerometer 102 establishes a three-dimensional coordinate system. The three-dimensional coordinate system includes three designated directions. When an acceleration is generated, the accelerometer 102 can detect acceleration components of the acceleration in three designated directions in the three-dimensional coordinate system, and the acceleration may be calculated by using the acceleration components in the three designated directions. The three designated directions are not absolute directions, but instead, are directions determined by using the accelerometer as a basis. For example, an X-Y-Z coordinate system includes an X-axis direction, a Y-axis direction, and a Z-axis direction. The X-axis direction and the Y-axis direction are two directions perpendicular to each other on a plane where the accelerometer is located. The Z-axis direction is a direction perpendicular to the plane where the accelerometer is located. When the attitude of the accelerometer changes, an X-axis direction, a Y-axis direction, and a Z-axis direction of the accelerometer also change correspondingly.

Therefore, the accelerometer 102 is disposed on the flexible screen 101, and the acceleration detected by the accelerometer 102 is the acceleration of the flexible screen 101. Moreover, the at least two accelerometers 102 is disposed on the flexible screen 101. The at least two accelerometers 102 are located in different positions on the flexible screen 101. When the flexible screen 101 is bent, directions of at least two accelerations detected by the at least two accelerometers 102 are different, and a bending angle of the flexible screen 102 may be calculated according to a difference between the at least two accelerations.

Therefore, the at least two accelerometers 102 detect the accelerations on the flexible screen 101, and send the accelerations to the processing module 103. The processing module 103 calculates a bending angle of the flexible screen 101 according to the accelerations detected by the at least two accelerometers 102, so as to calculate a bending speed of the flexible screen 101. The bending angle is used to represent a degree in which the flexible screen 101 is bent. The bending speed is a speed at which the bending angle of the flexible screen 101 is changed.

To ensure that when the flexible screen 101 moves, the at least two accelerometers 102 moves along with the movement of the flexible screen 101, the at least two accelerometers 102 may be fixed in different positions on an inner side of the flexible screen, so that the screen is not blocked, and the accuracy of detecting an acceleration can be ensured.

The processing module 103 is configured to perform data computation, and may be a central processing unit of the mobile terminal, or may be a sensor hub configured in the mobile terminal, or may be another control unit having a computing capability, which is not limited in this embodiment.

In consideration of that an application icon presentation interface of the mobile terminal includes a plurality of application icons, a user usually need to search the plurality of application icons for a target application icon. If currently displayed application icons do not include the target application icon that the user needs, the user usually needs to perform a swipe operation, to display subsequent application icons. In this embodiment, a manner of displaying an application icon on an application icon presentation interface is provided. When the processing module 103 displays the application icon presentation interface on the flexible screen 101, a plurality of application icons are scrolled and displayed. In this case, the user may search for the target application icon. Moreover, to prevent scrolling becoming too fast for the user to find the target application icon, or to prevent scrolling becoming too slow resulting in reduction of a search speed of the user, the processing module 103 controls a scrolling speed of an application icon according to the bending speed of the flexible screen 101.

That is, after calculating the bending speed, the processing module 103 may determine the scrolling speed of the application icon on the application icon presentation interface according to the current bending speed of the flexible screen 101. When the application icon presentation interface is displayed on the flexible screen 101, a plurality of application icons may be scrolled and displayed according to the determined scrolling speed. Therefore, in a process in which the user uses the mobile terminal, when the user needs to search the application icon presentation interface for an application, the user may control the scrolling speed of the application icon by controlling the speed at which the flexible screen 101 is bent.

The application icon presentation interface may be a main interface, an application device interface, a message notification interface or the like that needs to simultaneously display a plurality of application icons, which is not limited in this embodiment. When the plurality of application icons are scrolled and displayed, the plurality of application icons may be scrolled up or scrolled down, which is also not limited in this embodiment.

Further, to facilitate control by the user, the bending speed of the flexible screen 101 is positively correlated with the determined scrolling speed. That is, the faster the bending speed is, the faster the scrolling speed is, and the slower the bending speed is, the slower the scrolling speed is.

For the mobile terminal provided in this embodiment, at least two accelerometers are disposed in different positions on a flexible screen, the at least two accelerometers detect accelerations, and a processing module calculates a bending speed of the flexible screen according to the detected accelerations, and determines a scrolling speed of an application icon on an application icon presentation interface, so that a user conveniently controls the scrolling speed of the application icon by controlling the bending speed of the flexible screen. As such, the speed of finding an application icon is improved, and operations are facilitated.

In this embodiment, the processing module 103 may use a preset time length as a period. With an interval of the preset time length, the processing module 103 performs calculation according to the accelerations currently detected by the at least two accelerometers 102, to obtain a bending angle of the flexible screen 101, and calculates the bending speed of the flexible screen according to change in the obtained bending angle. The preset time length may be determined according to sampling frequency of the accelerometers 102. The higher the sampling frequency is, the smaller a corresponding preset time length is. The sampling frequency may be set to 100 HZ or another value, which is not limited in this embodiment.

When the bending angle changes faster, it represents that the bending speed of the flexible screen 101 is faster. When the sampling frequency of the accelerometer 102 is constant, the processing module 103 may calculate a difference value between two consecutively obtained bending angles, and use the difference value as the bending speed of the flexible screen 101. Alternatively, a quotient of a difference value between the two consecutively obtained bending speeds by the preset time length is used as the bending speed of the flexible screen 101, and a manner of calculating the bending speed is not limited in this embodiment.

After the processing module 103 calculates the bending speed, in addition to control of a scrolling speed when an application icon presentation interface is displayed, some other control operations may also be performed according to the bending speed. The control operations are, for example, controlling the flexible screen 101 to be turned on or turned off, or controlling the flexible screen 101 to display specific content, or controlling a display manner of the flexible screen. The control operations are also not limited in this embodiment of the disclosure.

In another embodiment, the flexible screen 101 may include a first part 1011 of the flexible screen and a second part 1012 of the flexible screen. When the flexible screen 101 is in a bent state, a particular angle is formed between the first part 1011 of the flexible screen and the second part 1012 of the flexible screen. When a user holds the mobile terminal in a hand, the user may view content displayed on the first part 1011 of the flexible screen, or may view content displayed on the second part 1012 of the flexible screen. To make it convenient for the user to search for a target application icon, in a process of scrolling and displaying a plurality of application icons on the flexible screen 101, the processing module 103 may highlight, on the first part 1011 of the flexible screen, an application icon located in a designated position of the first part 1011 of the flexible screen, and highlight, on the second part 1012 of the flexible screen, an application icon in a designated position of the second part of the flexible screen.

The designated position may be a plurality of positions such as a top position, a central position, and a bottom position. A highlighting may be implemented through display by using a color that is more visible than those of other application icons, by using a size larger than those of the other application icons, or the like, which is not limited in this embodiment.

Figure 2:
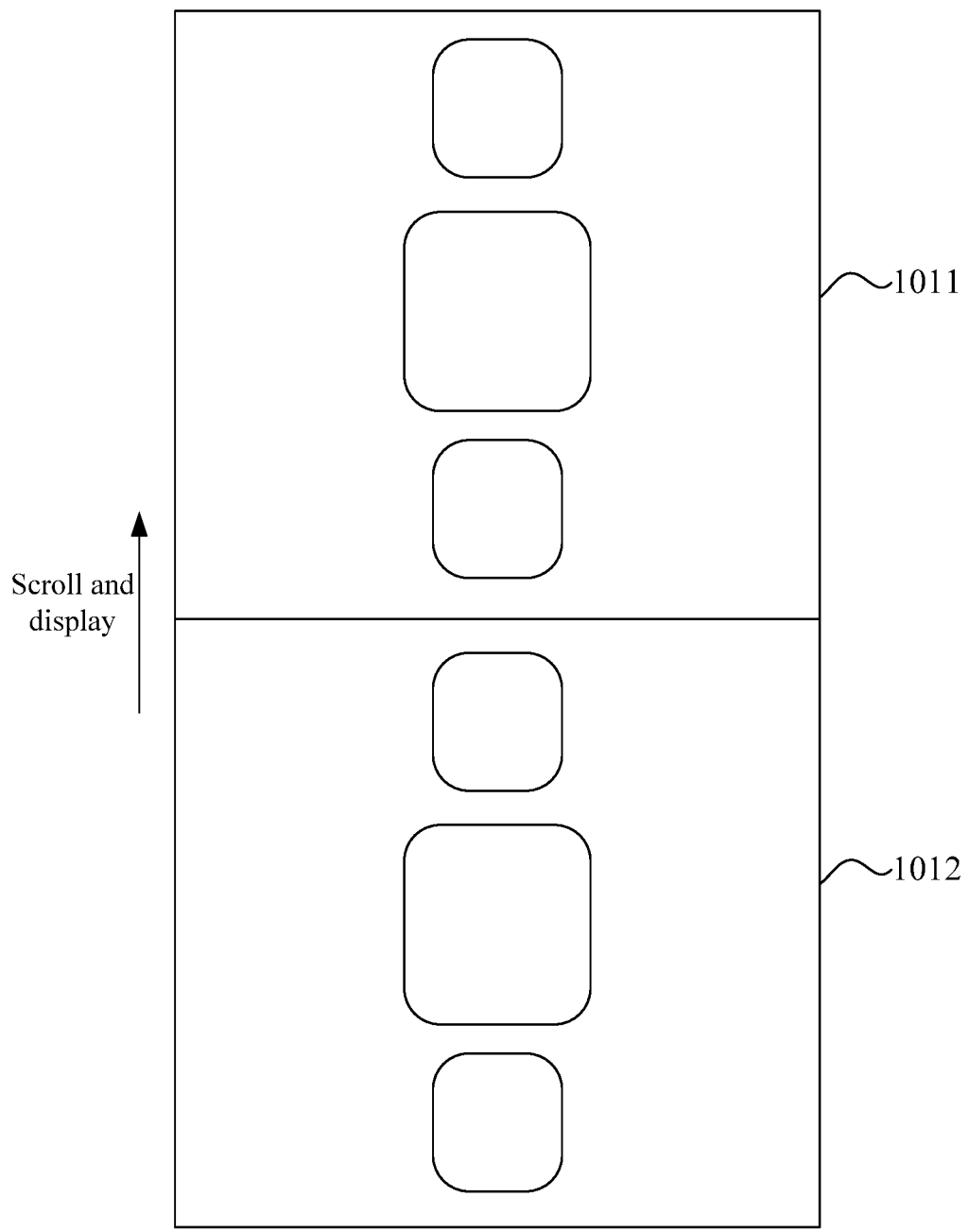
FIG. 2 is a schematic diagram of displaying an application icon according to an exemplary embodiment.

Referring to FIG. 2, the designated position may be central position. In this case, the processing module 103 may display, on the first part 1011 of the flexible screen, an application icon located in a central position by using a relatively large size, and display, on the second part 1012 of the flexible screen, an application icon located in a central position by using a relatively large size.

In another embodiment, to ensure that the calculated bending angle may accurately represent a bending degree of the flexible screen 101, a distance between the at least two accelerometers 102 cannot be too small. Therefore, in this embodiment, a distance between any two accelerometers 102 of the at least two accelerometers 102 is greater than a preset distance, that is, the distance between b any two accelerometers 102 is relatively large. The preset distance may be determined by a developer of the mobile terminal through a plurality of tests, or may be determined in another manner, which is not limited in this embodiment. For example, the at least two accelerometers 102 may be disposed at two ends of the flexible screen 101, respectively.

In another embodiment, when the flexible screen 101 is bent, the accelerations detected by the at least two accelerometers 102 have different directions. In this case, acceleration components in designated directions are also different. Therefore, the bending angle of the flexible screen 102 may be calculated according to the detected acceleration components.

Therefore, the at least two accelerometers 102 detect acceleration components of the flexible screen 101 in any one or more designated directions. The processing module 103 calculates the bending angle of the flexible screen 101 according to the acceleration components detected by the at least two accelerometers 102.

Figure 3A:
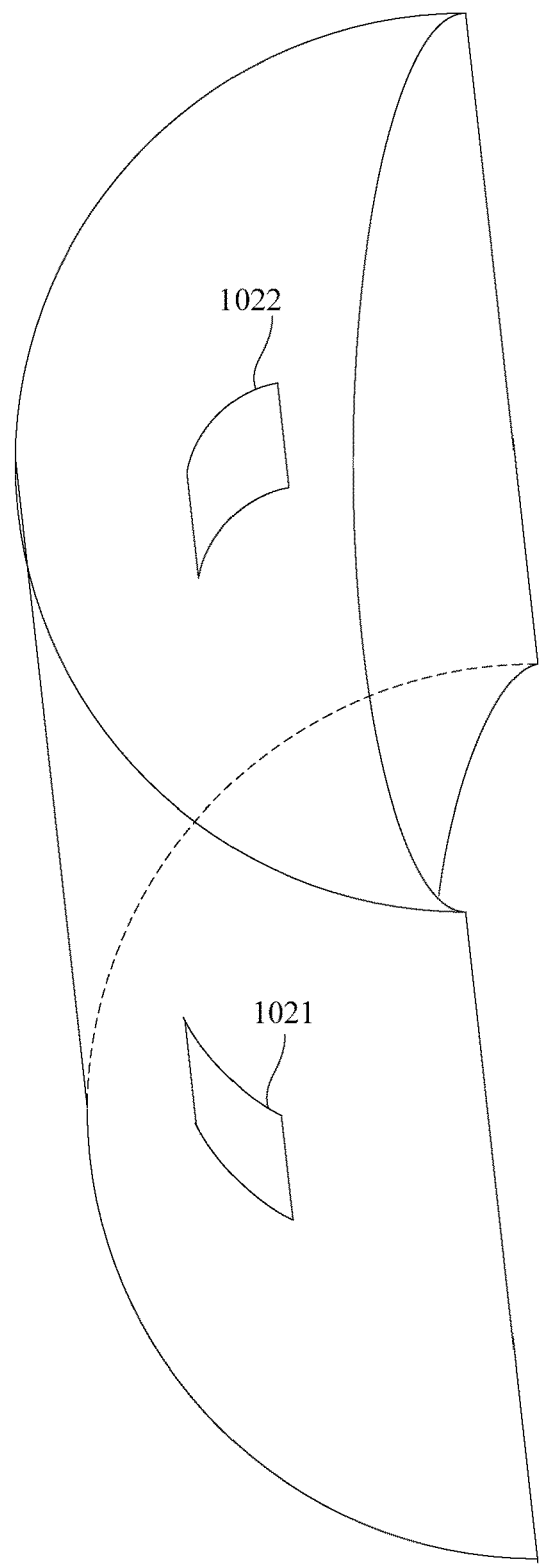
FIG. 3A is a schematic diagram of a flexible screen in a bent state according to an exemplary embodiment.

For example, referring to FIG. 3A, FIG. 3A is a schematic diagram of the flexible screen 101 in a bent state. For example, the at least two accelerometers 102 includes a first accelerometer 1021 and a second accelerometer 1022. The first accelerometer 1021 is located on the first part of the flexible screen, and the second accelerometer 1022 is located on the second part of the flexible screen. A particular angle is formed between the first part of the flexible screen and the second part of the flexible screen. The designated directions include an X-axis direction, a Y-axis direction, and a Z-axis direction. Therefore, the first accelerometer and the second accelerometer may detect the acceleration components of an acceleration in the X-axis direction, the Y-axis direction, and the Z-axis direction.

Figure 3B:
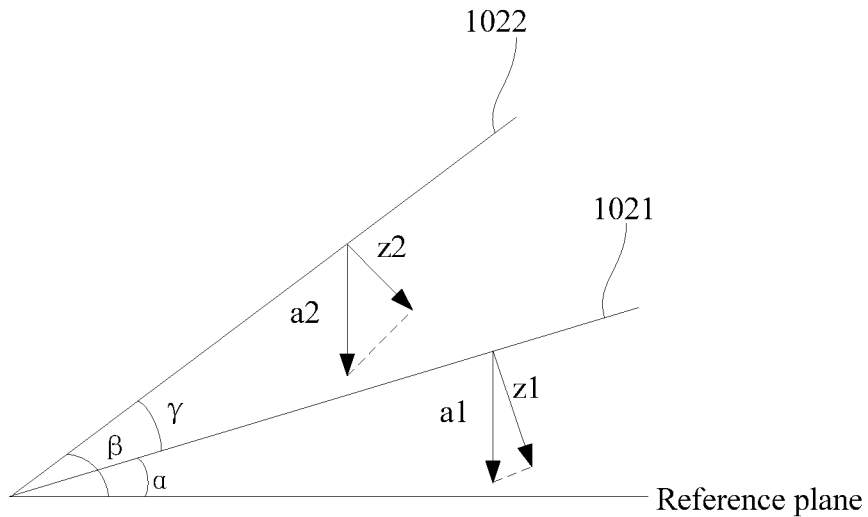
FIG. 3B is a side view of a flexible screen according to an exemplary embodiment.

FIG. 3B is a side view (a top view of FIG. 3A) of the flexible screen 101. A reference plane is a horizontal plane. An acceleration of the first accelerometer 1021 is a1, where an acceleration component in the X-axis direction is x1, an acceleration component in the Y-axis direction is y1, and an acceleration component in the Z-axis direction is z1; therefore, $a1=\sqrt{x1^2+y1^2+z1^2}$. An acceleration of the second accelerometer 1022 is a2, an acceleration component in the X-axis direction is x2, an acceleration component in the Y-axis direction is y2, and an acceleration component in the Z-axis direction is z2; therefore, $a2=\sqrt{x2^2+y2^2+z2^2}$. An included angle γ between the first accelerometer 1021 and the second accelerometer 1022 may represent the bending angle of the flexible screen.

$$\text{Because } \beta = \arccos\left(\frac{z2}{a2}\right) \text{ and } \alpha = \arccos\left(\frac{z1}{a1}\right),$$

$$\gamma = |\beta - \alpha| = \left|\arccos\left(\frac{z2}{\sqrt{x2^2+y2^2+z2^2}}\right) - \arccos\left(\frac{z1}{\sqrt{x1^2+y1^2+z1^2}}\right)\right|.$$

That is, the processing module 103 may apply the foregoing formula, so as to calculate the bending angle of the flexible screen 101.

In real life, in consideration of that the mobile terminal is usually in a static state, an acceleration is approximately the gravitational acceleration g. Even if the mobile terminal is in a moving state, the mobile terminal usually moves at a constant speed instead of moving relatively radically. It may be regarded that the acceleration is still the gravitational acceleration g. Therefore, to reduce computing work, the processing module 103 does not need to calculate the acceleration of each accelerometer. Instead, an acceleration of accelerometer is g by default. Therefore, the first accelerometer 1021 and the second accelerometer 1022 only need to send, to the processing module 103, the acceleration component detected in the Z-axis direction. The processing module 103 calculates the bending angle of the flexible screen 101 according to the acceleration components in the Z-axis direction that are detected by the first accelerometer 1021 and the second accelerometer 1022 by applying a following formula: γ=|arccos(z2/g)−arccos(z1/g)|.

The foregoing formula is only an example in a case where the mobile terminal includes two accelerometers. In fact, when the mobile terminal includes two or more accelerometers, a manner of calculating a bending angle is similar to this. For example, the processing module 103 may calculate, in the foregoing manner, a bending angle according to acceleration components detected by any two accelerometers, to obtain a plurality of bending angles, and calculate an average value of the plurality of bending angles, and use the average value as the eventually determined bending angle.

Figure 4:
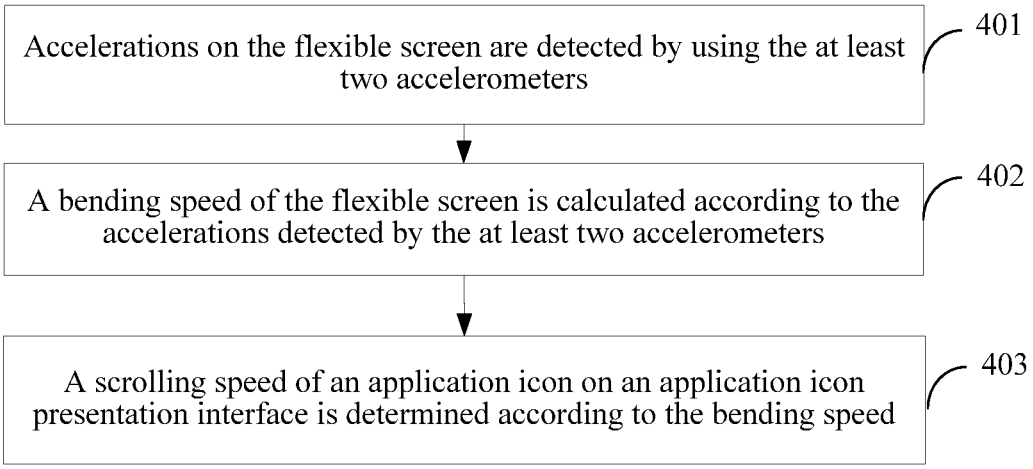
FIG. 4 is a flowchart of a method for determining a scrolling speed according to an exemplary embodiment.

FIG. 4 is a flowchart of a method for determining a scrolling speed according to an exemplary embodiment. As shown in FIG. 4, the method for determining a scrolling speed is used in a mobile terminal. The mobile terminal at least includes a flexible screen and at least two accelerometers located in different positions on the flexible screen. The method includes the following steps.

In step 401, accelerations on the flexible screen are detected by using the at least two accelerometers.

In step 402, a bending speed of the flexible screen is calculated according to the accelerations detected by the at least two accelerometers, where the bending speed is a changing speed of a bending angle of the flexible screen.

In step 403: a scrolling speed of an application icon on an application icon presentation interface is determined according to the bending speed.

For the method provided in this embodiment, at least two accelerometers are disposed in different positions on a flexible screen, the at least two accelerometers detect accelerations, and a processing module calculates a bending speed of the flexible screen according to the detected accelerations, and determines a scrolling speed of an application icon on an application icon presentation interface, so that a user conveniently controls the scrolling speed of the application icon by controlling the bending speed of the flexible screen. As such, the speed of finding an application icon is improved, and operations are facilitated.

In another embodiment, the bending speed is positively correlated with the scrolling speed.

In another embodiment, the method further includes: scrolling and displaying a plurality of application icons on the application icon presentation interface on the flexible screen at the scrolling speed.

In another embodiment, the flexible screen includes a first part of the flexible screen and a second part of the flexible screen. The method further includes:

in a process of scrolling and displaying the plurality of application icons on the flexible screen, highlighting, on the first part of the flexible screen, an application icon located in a designated position of the first part of the flexible screen, and highlighting, on the second part of the flexible screen, an application icon located in a designated position of the second part of the flexible screen.

In another embodiment, a distance between any two accelerometers of the at least two accelerometers is greater than a preset distance.

In another embodiment, the method further includes: detecting acceleration components of the flexible screen in designated directions by the at least two accelerometers; calculating the bending angle of the flexible screen according to the acceleration components detected by the at least two accelerometers, where the bending angle is used to represent a bending degree of the flexible screen; and calculating the bending speed according to change in the bending angle.

In another embodiment, the at least two accelerometers include a first accelerometer and a second accelerometer, and the designated directions include an X-axis direction, a Y-axis direction, and a Z-axis direction; and the calculating the bending angle of the flexible screen according to the acceleration components detected by the at least two accelerometers includes: calculating the bending angle of the flexible screen according to the acceleration components detected by the first accelerometer and the second accelerometer by applying a following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|,$$

where γ represents the bending angle of the flexible screen, x1, y1, and z1 represent the acceleration components in the X-axis direction, the Y-axis direction, and the Z-axis direction, respectively, that are detected by the first accelerometer, and x2, y2, and z2 represent the acceleration components in the X-axis direction, the Y-axis direction, and the Z-axis direction, respectively, that are detected by the second accelerometer.

Figure 5:
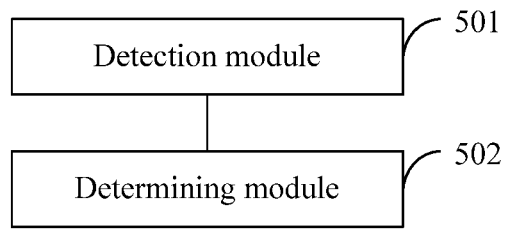
FIG. 5 is a block diagram of a mobile terminal according to an exemplary embodiment.

FIG. 5 is a block diagram of a mobile terminal according to an exemplary embodiment. Referring to FIG. 5, the mobile terminal includes a detection module 501 and a determining module 502.

The detection module 501 is configured to detect accelerations on a flexible screen by using at least two accelerometers located in different positions on the flexible screen.

The determining module 502 is configured to calculate a bending speed of the flexible screen according to the accelerations detected by the at least two accelerometers, and determine a scrolling speed of an application icon on an application icon presentation interface according to the bending speed, where the bending speed is a changing speed of a bending angle of the flexible screen.

In another embodiment, the bending speed is positively correlated with the scrolling speed.

In another embodiment, the apparatus further includes: a display module, configured to scroll and display a plurality of application icons on the application icon presentation interface on the flexible screen at the scrolling speed.

In another embodiment, the flexible screen includes a first part of the flexible screen and a second part of the flexible screen and the display module is configured to: in a process of scrolling and displaying the plurality of application icons on the flexible screen, highlight, on the first part of the flexible screen, an application icon located in a designated position of the first part of the flexible screen, and highlight, on the second part of the flexible screen, an application icon located in a designated position of the second part of the flexible screen.

In another embodiment, a distance between any two accelerometers of the at least two accelerometers is greater than a preset distance.

In another embodiment, the detection module 501 is configured to detect acceleration components of the flexible screen in designated directions by using the at least two accelerometers.

The determining module 502 is configured to calculate the bending angle of the flexible screen according to the acceleration components detected by the at least two accelerometers, where the bending angle is used to represent a bending degree of the flexible screen; and calculate the bending speed according to change in the bending angle.

In another embodiment, the at least two accelerometers include a first accelerometer and a second accelerometer, and the designated directions include an X-axis direction, a Y-axis direction, and a Z-axis direction. The determining module 502 is configured to calculate the bending angle of the flexible screen according to the acceleration components detected by the first accelerometer and the second accelerometer by applying a following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|,$$

where γ represents the bending angle of the flexible screen, x1, y1, and z1 represent the acceleration components in the X-axis direction, the Y-axis direction, and the Z-axis direction, respectively, that are detected by the first accelerometer, and x2, y2, and z2 represent the acceleration components in the X-axis direction, the Y-axis direction, and the Z-axis direction, respectively, that are detected by the second accelerometer.

It should be noted that the above functional modules are only described for exemplary purposes for the mobile terminal provided in the foregoing embodiment. In actual applications, the above functions may be allocated to different functional modules according to needs, which means that the internal structure of the mobile terminal is divided into different functional modules to complete all or some of the above described functions. Moreover, the mobile terminal provided by the foregoing embodiments is based on the same concept as the embodiment of the method for calculating a bending angle. For the specific implementation process, refer to the method embodiments, and the details are not described herein again.

Figure 6:
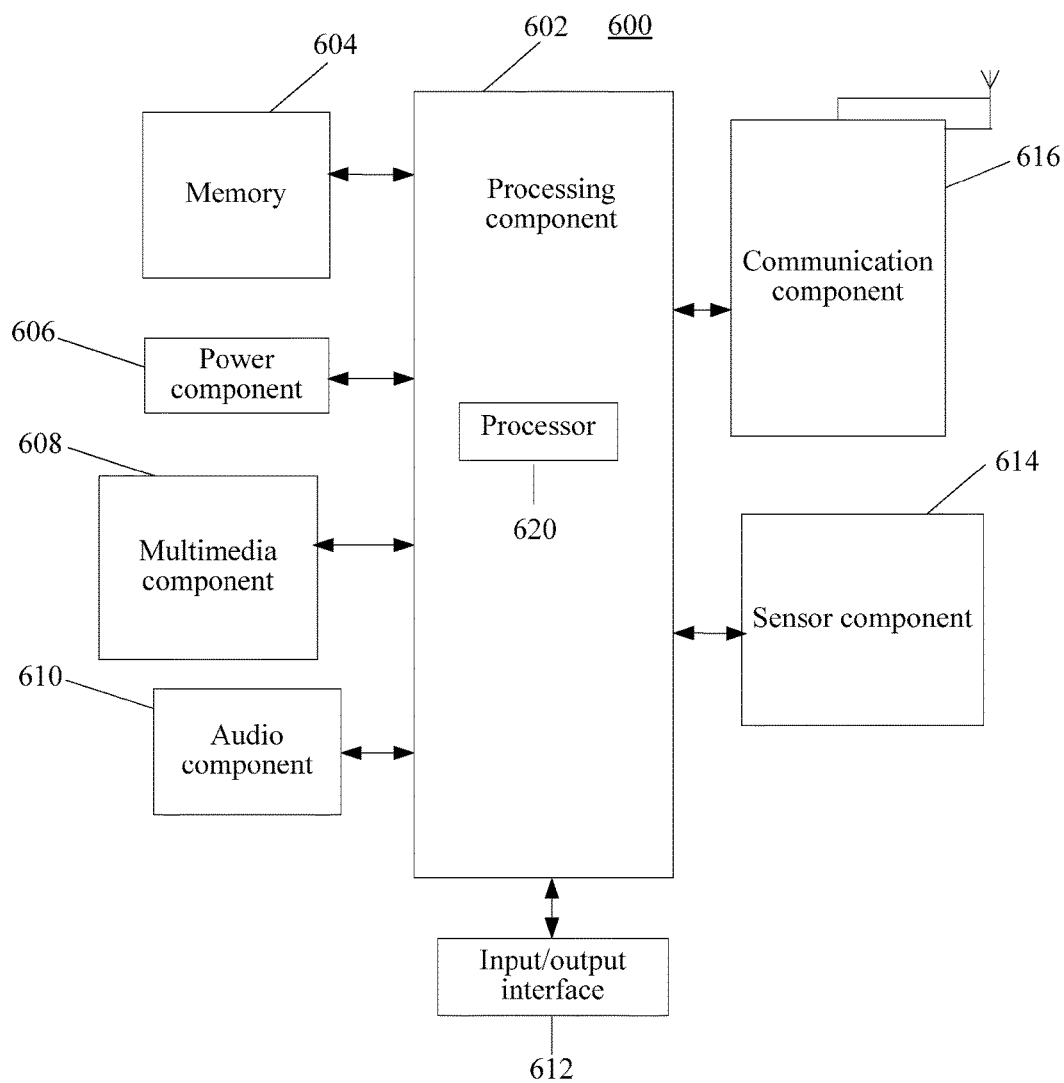
FIG. 6 is a block diagram of a mobile terminal according to an exemplary embodiment.

FIG. 6 is a block diagram of a mobile terminal 600 according to an exemplary embodiment. For example, the mobile terminal 600 may be a mobile telephone, a computer, a digital broadcast terminal, a messaging device, a gaming console, a tablet, a medical device, exercise equipment, a personal digital assistant, or the like.

Referring to FIG. 6, the mobile terminal 600 may include one or more of a processing component 602, a memory 604, a power component 606, a multimedia component 608, an audio component 610, an input/output (I/O) interface 612, a sensor component 614, and a communication component 616.

The processing component 602 typically controls overall operations of the mobile terminal 600, such as the operations associated with display, telephone calls, data communications, camera operations, and recording operations. The processing component 602 may include one or more processors 620 to execute instructions to implement all or part of the steps in the above described methods. Moreover, the processing component 602 may include one or more modules which facilitate the interaction between the processing component 602 and other components. For example, the processing component 602 may include a multimedia module to facilitate the interaction between the multimedia component 608 and the processing component 602.

The memory 604 is configured to store various types of data to support the operation of the mobile terminal 600. Examples of such data include instructions for any applications or methods operated on the mobile terminal 600, contact data, phonebook data, messages, pictures, video, etc. The memory 604 may be implemented using any type of volatile or non-volatile memory devices, or a combination thereof, such as, a Static Random Access Memory (SRAM), an Electrically-Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 606 provides power to various components of the mobile terminal 600. The power component 606 may include a power management system, one or more power sources, and any other components associated with the generation, management, and distribution of power in the mobile terminal 600.

The multimedia component 608 includes a screen providing an output interface between the mobile terminal 600 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes, and gestures on the TP. The touch sensors may not only sense a boundary of a touch or swipe operation, but also sense a period of time during which the touch or swipe action is performed, and a pressure associated with the touch or swipe action. In some embodiments, the multimedia component 608 includes a front camera and/or a rear camera. The front camera and/or the rear camera may receive external multimedia data while the mobile terminal 600 is in an operation mode, such as a photographing mode or a video mode. Each of the front camera and the rear camera may be a fixed optical lens system or have focus and optical zoom capability. In this embodiment, the mobile terminal 600 includes a flexible screen.

The audio component 610 is configured to output and/or input audio signals. For example, the audio component 610 includes a microphone (MIC) configured to receive an external audio signal when the mobile terminal 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide assessments on status of various aspects of the mobile terminal 600. For instance, the sensor component 614 may detect an on/off state of the mobile terminal 600, relative positioning of components, such as the display and the keypad, of the mobile terminal 600. The sensor component 614 may further detect a change in position of the mobile terminal 600 or a change in position of a component of the mobile terminal 600, a presence or absence of user contact with the mobile terminal 600, an orientation or an acceleration/deceleration of the mobile terminal 600, and a change in temperature of the mobile terminal 600. The sensor component 614 may include a proximity sensor configured to detect the presence of nearby objects without any physical contact. The sensor component 614 may also include a light sensor, such as a Complementary Metal-Oxide-Semiconductor (CMOS) or Charge-Coupled Device (CCD) image sensor, for use in imaging applications. In some embodiments, the sensor component 614 may also include an acceleration sensor, a gyroscope sensor, a magnetic sensor, a pressure sensor, or a temperature sensor. In this embodiment, at least two accelerometers are disposed in different positions on the flexible screen and are configured to detect accelerations.

The communication component 616 is configured to facilitate wired or wireless communication between the mobile terminal 600 and other devices. The mobile terminal 600 can access a wireless network based on a communications standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth (BT) technology, and other technologies.

In exemplary embodiments, the mobile terminal 600 may be implemented with one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by a processing unit 620 in the mobile terminal 600, for performing the above-described methods. For example, the non-transitory computer-readable storage medium may be a ROM, a Compact Disc Read-Only Memory (CD-ROM), a magnetic tape, a floppy disc, an optical data storage device, or the like.

The non-transitory computer readable storage medium enables, when the instructions in the storage medium are executed by the processor of the mobile terminal, the mobile terminal to perform a method for determining a scrolling speed, where the method includes: detecting, by the at least two accelerometers, accelerations on the flexible screen; calculating a bending speed of the flexible screen according to the accelerations detected by the at least two accelerometers, where the bending speed is a changing speed of a bending angle of the flexible screen; and determining a scrolling speed of an application icon on an application icon presentation interface according to the bending speed.

In another embodiment, the bending speed is positively correlated with the scrolling speed.

In another embodiment, the method further includes: scrolling and displaying a plurality of application icons on the application icon presentation interface on the flexible screen at the scrolling speed.

In another embodiment, the flexible screen includes a first part of the flexible screen and a second part of the flexible screen; and the method further includes: in a process of scrolling and displaying the plurality of application icons on the flexible screen, highlighting, on the first part of the flexible screen, an application icon located in a designated position of the first part of the flexible screen, and highlighting, on the second part of the flexible screen, an application icon located in a designated position of the second part of the flexible screen.

In another embodiment, a distance between any two accelerometers of the at least two accelerometers is greater than a preset distance.

In another embodiment, the method further includes: detecting, by the at least two accelerometers, acceleration components of the flexible screen in designated directions; calculating the bending angle of the flexible screen according to the acceleration components detected by the at least two accelerometers, where the bending angle is used to represent a bending degree of the flexible screen; and calculating the bending speed according to change in the bending angle.

In another embodiment, the at least two accelerometers include a first accelerometer and a second accelerometer, and the designated directions include an X-axis direction, a Y-axis direction, and a Z-axis direction; and the calculating the bending angle of the flexible screen according to the acceleration components detected by the at least two accelerometers includes: calculating the bending angle of the flexible screen according to the acceleration components detected by the first accelerometer and the second accelerometer by applying a following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|,$$

where $\gamma$ represents the bending angle of the flexible screen, $x1$, $y1$, and $z1$ represent the acceleration components in the X-axis direction, the Y-axis direction, and the Z-axis direction, respectively, that are detected by the first accelerometer, and $x2$, $y2$, and $z2$ represent the acceleration components in the X-axis direction, the Y-axis direction, and the Z-axis direction, respectively, that are detected by the second accelerometer.

After considering the specification and implementing the embodiments disclosed herein, a person skilled in the art may easily conceive of another implementation solution of the disclosure. This application intends to cover any variations, uses or adaptive changes of the disclosure, and these variations, uses or adaptive changes comply with the general principle of the disclosure and include common knowledge or common technical means of in the technical field that is not disclosed in the disclosure. The specification and the embodiments are only considered to be exemplary, and the actual scope and spirit of the disclosure are disclosed in the claims below.

It should be understood that the disclosure is not limited to the precise structures that are described above and shown in the accompanying drawings, and various modifications and changes can be made without departing from the scope of the disclosure. The scope of disclosure is defined by only the appended claims.

What is claimed is:

1. A mobile terminal comprising:
a flexible screen configured to display an application icon on an application icon presentation interface;
at least two accelerometers located in different positions on the flexible screen, the at least two accelerometers being configured to detect accelerations on the flexible screen; and
a processing module configured to calculate a bending speed of the flexible screen according to the accelerations detected by the at least two accelerometers, and determine a scrolling speed of the application icon on the application icon presentation interface according to the bending speed, wherein the bending speed is a changing speed of a bending angle of the flexible screen;
wherein:
the bending angle of the flexible screen is calculated according to acceleration components detected by the at least two accelerometers, the at least two accelerometers sending, to the processing module, the acceleration components detected in a Z-axis direction, which is perpendicular to the plane of the screen; and
the processing module calculates the bending angle of the flexible screen according to the acceleration component in the Z-axis direction of each accelerometer only.

2. The mobile terminal of claim 1, wherein the bending speed is positively correlated with the scrolling speed.

3. The mobile terminal of claim 1, wherein the processing module is further configured to scroll and display a plurality of application icons on the application icon presentation interface on the flexible screen at the scrolling speed.

4. The mobile terminal of claim 3, wherein the flexible screen comprises a first part of the flexible screen and a second part of the flexible screen; and
wherein in a process of scrolling and displaying the plurality of application icons on the flexible screen, the processing module is further configured to:
highlight, on the first part of the flexible screen, an application icon located in a designated position of the first part of the flexible screen; and
highlight, on the second part of the flexible screen, an application icon located in a designated position of the second part of the flexible screen.

5. The mobile terminal of claim 1, wherein a distance between any two accelerometers of the at least two accelerometers is greater than a preset distance.

6. The mobile terminal of claim 1, wherein the at least two accelerometers are configured to detect acceleration components of the flexible screen in designated directions respectively; and
wherein the processing module is configured to:
calculate the bending angle of the flexible screen according to the acceleration components detected by the at least two accelerometers, the bending angle being used to represent a bending degree of the flexible screen; and
calculate the bending speed according to change in the bending angle.

7. A method for determining a scrolling speed, applied to a mobile terminal which comprises a flexible screen for displaying an application icon on an application icon presentation interface, at least two accelerometers located in different positions on the flexible screen, and a processing module, the method comprising:
detecting, by the at least two accelerometers, accelerations on the flexible screen;
calculating, by the processing module, a bending speed of the flexible screen according to the accelerations detected by the at least two accelerometers, wherein the bending speed is a changing speed of a bending angle of the flexible screen; and
determining, by the processing module, a scrolling speed of the application icon on the application icon presentation interface according to the bending speed;
wherein:
the bending angle of the flexible screen is calculated according to acceleration components detected by the at least two accelerometers;
detecting, by the at least two accelerometers, accelerations on the flexible screen comprises: detecting acceleration component in a Z-axis direction, which is perpendicular to the plane of the screen, and wherein the bending angle of the flexible screen is calculated according to the acceleration component in the Z-axis direction of each accelerometer only.

8. The method of claim 7, wherein the bending speed is positively correlated with the scrolling speed.

9. The method of claim 7, wherein the method further comprises:
scrolling and displaying a plurality of application icons on the application icon presentation interface on the flexible screen at the scrolling speed.

10. The method of claim 9, wherein the flexible screen comprises a first part of the flexible screen and a second part of the flexible screen; and wherein in a process of scrolling and displaying the plurality of application icons on the flexible screen, the method further comprises:
highlighting, on the first part of the flexible screen, an application icon located in a designated position of the first part of the flexible screen; and
highlighting, on the second part of the flexible screen, an application icon located in a designated position of the second part of the flexible screen.

11. The method of claim 7, wherein a distance between any two accelerometers of the at least two accelerometers is greater than a preset distance.

12. The method of claim 7, wherein the method further comprises:
detecting, by the at least two accelerators, acceleration components of the flexible screen in designated directions;
calculating the bending angle of the flexible screen according to the acceleration components detected by the at least two accelerometers, wherein the bending angle is used to represent a bending degree of the flexible screen; and
calculating the bending speed according to change in the bending angle.

13. A mobile terminal, comprising:
a processor; and
a memory for storing instructions executable by the processor;
wherein the processor is configured to:
detect accelerations on a flexible screen by using at least two accelerometers located in different positions on the flexible screen; and
calculate a bending speed of the flexible screen according to the accelerations detected by the at least two accelerometers; and
determine a scrolling speed of an application icon on an application icon presentation interface according to the bending speed, wherein the bending speed is a changing speed of a bending angle of the flexible screen;
wherein:
the bending angle of the flexible screen is calculated according to acceleration components detected by the at least two accelerometers;
the processor is further configured to: detect acceleration component in a Z-axis direction, which is perpendicular to the plane of the screen, and wherein the bending angle of the flexible screen is calculated according to the acceleration component in the Z-axis direction of each accelerometer only.

14. The mobile terminal of claim 13, wherein the bending speed is positively correlated with the scrolling speed.

15. The mobile terminal of claim 13, wherein the processor is further configured to:
scroll and display a plurality of application icons on the application icon presentation interface on the flexible screen at the scrolling speed.

16. The mobile terminal of claim 15, wherein the flexible screen comprises a first part of the flexible screen and a second part of the flexible screen; and wherein in a process of scrolling and displaying the plurality of application icons on the flexible screen, the processor is further configured to:
highlight, on the first part of the flexible screen, an application icon located in a designated position of the first part of the flexible screen; and
highlight, on the second part of the flexible screen, an application icon located in a designated position of the second part of the flexible screen.

17. The mobile terminal of claim 13, wherein a distance between any two accelerometers of the at least two accelerometers is greater than a preset distance.

18. The mobile terminal of claim 13, wherein the processor is further configured to:
- detect, by the at least two accelerators, acceleration components of the flexible screen in designated directions;
- calculate the bending angle of the flexible screen according to the acceleration components detected by the at least two accelerometers, wherein the bending angle is used to represent a bending degree of the flexible screen; and
- calculate the bending speed according to change in the bending angle.

* * * * *